United States Patent
Kametani

(10) Patent No.: US 7,933,042 B2
(45) Date of Patent: Apr. 26, 2011

(54) IMAGE DOCUMENT CREATION DEVICE, METHOD FOR PRINTING IMAGE DOCUMENT, PROGRAM FOR PRINTING IMAGE DOCUMENT, AND RECORDING MEDIUM

(75) Inventor: Yohsuke Kametani, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 697 days.

(21) Appl. No.: 11/972,520

(22) Filed: Jan. 10, 2008

(65) Prior Publication Data
US 2008/0180704 A1 Jul. 31, 2008

(30) Foreign Application Priority Data
Jan. 12, 2007 (JP) .................................. 2007-004933

(51) Int. Cl.
*H04N 1/60* (2006.01)
(52) U.S. Cl. ...... 358/1.9; 358/1.15; 358/3.26; 358/3.27; 358/518; 358/519; 358/520
(58) Field of Classification Search .................. 358/1.9, 358/1.13, 1.15, 3.26, 3.27, 518, 519, 520
See application file for complete search history.

(56) References Cited

U.S. PATENT DOCUMENTS

| | | | |
|---|---|---|---|
| 6,369,909 B1 * | 4/2002 | Shima | 358/1.15 |
| 6,552,813 B2 * | 4/2003 | Yacoub | 358/1.1 |
| 6,563,944 B1 * | 5/2003 | Kumada | 382/162 |
| 6,700,678 B1 * | 3/2004 | Luman | 358/1.15 |
| 7,180,619 B2 * | 2/2007 | Ferlitsch | 358/1.15 |
| 7,355,745 B2 * | 4/2008 | Hudson et al. | 358/1.9 |
| 7,369,271 B2 * | 5/2008 | Itagaki | 358/1.9 |
| 2002/0145627 A1 * | 10/2002 | Whitmarsh et al. | 345/745 |
| 2005/0036157 A1 * | 2/2005 | Takabayashi et al. | 358/1.9 |
| 2006/0050308 A1 * | 3/2006 | Wakana | 358/1.15 |
| 2006/0158672 A1 * | 7/2006 | Kondo | 358/1.9 |

FOREIGN PATENT DOCUMENTS

| | | |
|---|---|---|
| JP | 8-249441 A | 9/1996 |
| JP | 2000-276319 A | 10/2000 |
| JP | 2003-266891 A | 9/2003 |
| JP | 2004-5385 A | 1/2004 |
| JP | 2006-92118 A | 4/2006 |

* cited by examiner

Primary Examiner — King Y Poon
Assistant Examiner — Richard Z Zhu
(74) Attorney, Agent, or Firm — Birch, Stewart, Kolasch & Birch, LLP

(57) ABSTRACT

According to one embodiment of the invention, an image document creation apparatus is provided so as to be connectable to a plurality of image forming apparatuses that have been arranged on a network, and has a configuration provided with an acquisition means that acquires color gamut information possessed by the image forming apparatuses; an identification means that identifies colors included in document data and/or image data saved in the image document creation apparatus; a color difference calculation means that calculates, for each of the image forming apparatuses, a color difference between the colors identified by the identification means and the color gamut information acquired by the acquisition means; an apparatus selection means that selects an image forming apparatus as a print target based on the calculated color difference; and a printing means that instructs the selected image forming apparatus to print the document data and/or the image data.

20 Claims, 15 Drawing Sheets

FIG.3

| ΔE (Color Difference) | Color Difference Perception | |
|---|---|---|
| 0 | Non | no color difference |
| 0~0.5 | Trace | faintly perceivable |
| 0.5~1.5 | Slight | slightly perceivable |
| 1.5~3.0 | Noticeable | very perceivable |
| 3.0~6.0 | Appreciable | appreciably perceivable |
| 6.0~ | Much | large |

IMAGE DOCUMENT CREATION DEVICE, METHOD FOR PRINTING IMAGE DOCUMENT, PROGRAM FOR PRINTING IMAGE DOCUMENT, AND RECORDING MEDIUM

CROSS-REFERENCE TO RELATED APPLICATION

This application claims priority under 35 U.S.C. §119(a) on Japanese Patent Application No. 2007-004933 filed in Japan on Jan. 12, 2007, the entire contents of which are herein incorporated by reference.

BACKGROUND OF THE INVENTION

1. Field of the Invention

The present invention relates to an image document creation apparatus provided so as to be connectable to a plurality of image forming apparatuses on a network, and more specifically relates to an image document creation apparatus, a method for printing an image document, a program for printing an image document, and a recording medium capable of selecting as a printing target apparatus an image forming apparatus with a small color difference from colors included in document data and/or image data, and capable of notifying a user of a color gamut insufficiency when the color difference exceeds an allowable range.

2. Description of the Related Art

Conventionally, systems and methods have been proposed with a configuration such that when all of the colors included in print data are not supported in the color gamut of an image forming apparatus used to print that print data, a user is notified of a color gamut insufficiency (for example, see JP 2004-5385A).

In such a system, in an image forming apparatus capable of printing print data, the color gamut included in the print data and the color gamut that the image forming apparatus is capable of expressing are compared, and when one or more of identified colors are not included in the color gamut possessed by the image forming apparatus, the user is notified of that fact. More specifically, whether or not colors that can be expressed by the image forming apparatus are included in the print data is determined from whether or not the colors are included in the absolute color gamut of a color profile, the user is notified of the result of this determination, and the user is caused to select whether or not to print the print data.

However, with the technique described in above JP 2004-5385A, not only when there is a large difference between the colors included in the print data and the colors expressed with the image forming apparatus, but also when a difference between the colors included in the print data and the colors expressed with the image forming apparatus is somewhat allowable, or when the difference is of a level that is indistinguishable with human eyesight, the user is likewise notified that a color included in the print data is not included in the color gamut that can be expressed with the image forming apparatus. Thus, there is the problem that the user must decide themselves every time whether or not to print, even when there is no obstacle to printing as-is, such as when the difference between the colors included in the print data and the colors expressed with the image forming apparatus is an allowable difference, or when the difference is of a level that is indistinguishable with human eyesight. Furthermore, in this case the user is only notified that at least one of the colors included in the print data is not included in the color gamut that the image forming apparatus can express, and the user cannot know in a perceptual manner the extent of the difference from appearance (i.e., whether the difference is of an extent that the user can allow). Thus, there is the problem that when the extent of the color difference is judged when printing, the user does not know the extent of the difference between colors printed with the image forming apparatus and colors included in the print data unless the print data is actually printed out.

SUMMARY OF THE INVENTION

The present invention was made in order to address these problems, and it is an object thereof to provide an image document creation apparatus, a method for printing an image document, a program for printing an image document, and a recording medium capable of printing with colors that are closer to colors included in document data and/or image data.

Alternatively, it is an object of the present invention to provide an image document creation apparatus, a method for printing an image document, a program for printing an image document, and a recording medium that facilitate judging whether or not to print by notifying a user prior to printing of the extent of a color difference between colors included in print data and colors that are expressed with an image forming apparatus.

In order to address the above problems, the present invention provides an image document creation apparatus provided so as to be connectable to a plurality of image forming apparatuses that have been arranged on a network, the image document creation apparatus being provided with a color gamut information acquisition means that acquires color gamut information possessed by the image forming apparatuses; an identification means that identifies colors included in document data and/or image data that is saved in the image document creation apparatus; a color difference calculation means that calculates, for each of the image forming apparatuses, a color difference between the colors identified by the identification means and the color gamut information acquired by the color gamut information acquisition means; an apparatus selection means that selects an image forming apparatus as a print target based on the color difference calculated by the color difference calculation means; and a printing means that instructs the selected image forming apparatus to print the document data and/or the image data.

With this configuration, it is possible to obtain the color difference between the color gamut of image forming apparatuses and the colors possessed by document data and/or image data to be printed, select an image forming apparatus capable of expressing colors near the colors possessed by the document data and/or image data based on the obtained color difference, and thus print automatically. That is, it is possible to print with colors nearer to the colors included in the document data and/or image data.

Also, in the image document creation apparatus of the present invention, a configuration may be adopted in which the apparatus selection means selects as the print target the image forming apparatus having the smallest color difference, based on the color difference calculated by the color difference calculation means. The printing means instructs the image forming apparatus selected in this manner to print the document data and/or the image data.

With this configuration, it is possible to, for example, access image forming apparatuses on the network, obtain the color difference between the color gamut of each image forming apparatus and the colors possessed by document data and/or image data to be printed, compare the obtained color differences, select the image forming apparatus with the smallest color difference, i.e. the image forming apparatus capable of expressing colors nearest to the colors possessed by the print data, and thus print automatically.

In the image document creation apparatus of the present invention, a configuration may be adopted in which the color gamut information acquisition means confirms whether or not the image forming apparatus possesses a color conversion table such as a color profile or a reproduction color gamut indication, and when the image forming apparatus possesses a color conversion table, acquires that color conversion table as the color gamut information.

Also, in the image document creation apparatus of the present invention, a configuration may be adopted in which when the image forming apparatus does not possess a color conversion table, the color gamut information acquisition means acquires a color conversion table compatible with that image forming apparatus from outside via the network. Specifically, a color conversion table is publicly released at a website or the like of the manufacturer of that image forming apparatus, so the publicly released color conversion table is downloaded. Thus, it is possible to calculate a color difference also for an image forming apparatus that does not possess a color conversion table.

Also, in the image document creation apparatus of the present invention, a configuration may be adopted in which the color difference calculation means calculates a color difference by comparing the color conversion table to colors after color conversion according to the type (photograph, graphic, text, or the like) of document data and/or image data to be printed has been performed. In this manner, by comparing the colors designated by the document data and/or image data (print data) to the colors that will be printed with an image forming apparatus compatible with a color conversion method for which a printing language has been designated (perceptual for photographs, saturation for graphics, text, or the like), it is possible to eliminated color difference due to a difference in color conversion when obtaining the color difference.

Also, in the image document creation apparatus of the present invention, a configuration may be adopted in which are further provided a color difference table in which color difference perception messages corresponding to a plurality of color differences have been registered in advance, and a showing means that compares the color difference calculated with the color difference calculation means to the color difference table, extracts a color difference perception message that corresponds to the calculated color difference from the color difference table, and shows the extracted color difference perception message. By displaying this sort of color difference perception message, the user can determine whether or not to print in consideration of perception according to the message, and not only according to a numerical value of the color difference.

Here, the color difference table is made up of color differences ($\Delta E$) that have been divided into a plurality of levels, and color difference perception messages that correspond to the color differences. The color differences ($\Delta E$) are divided into six color difference levels of 0, 0 to less than 0.5, 0.5 to less than 1.5, 1.5 to less than 3.0, 3.0 to less than 6.0, and 6.0 or greater, and six types of perception messages are associated with the respective color difference levels: Non (no color difference), Trace (faintly perceivable), Slight (slightly perceivable), Noticeable (very perceivable), Appreciable (appreciably perceivable), and Much (large).

For example, when the color difference ($\Delta E$) calculated with the color difference calculation means is 2.0, the showing means selects the corresponding message 'very perceivable' and displays this message along with a device name or the like of the corresponding image forming apparatus. Thus, prior to printing, it is possible to know the extent of the color difference between colors included in the document data and/or image data to be printed and colors that are actually printed with an image forming apparatus, and so the user can select whether or not to print the document data and/or image data with an awareness of the extent of the color difference.

Also, in the image document creation apparatus of the present invention, a configuration may be adopted in which when the color difference calculated with the color difference calculation means is within an allowable range that has been set in advance, the printing means immediately starts printing of document data and/or image data, and when the calculated color difference is not within the allowable range, the printing means temporarily stops printing of document data and/or image data. Thus, when the colors designated by the printing language of the document data and/or image data are within the color gamut that is printable with the image forming apparatus (when the image forming apparatus supports all of the colors of the print data), and when colors outside of the color gamut that is printable with the image forming apparatus are within the allowable range, it is possible to immediately start printing of document data and/or image data.

Here, the allowable range of color difference is, from the above color difference table, 0 to less than 1.5, and when the calculated color difference is within this range, the printing means immediately starts printing of document data and/or image data from an image forming apparatus in that allowable range. On the other hand, when the detected color difference is 1.5 or greater, printing of document data and/or image data is temporarily stopped, the above message is displayed in a display unit, and the user is caused to determine whether or not to execute printing as-is.

Also, in the image document creation apparatus of the present invention, a configuration may be adopted in which an exclusion table is provided in which information of an image forming apparatus excluded from selection targets has been registered in advance, and prior to selection of the color gamut information possessed by the image forming apparatuses on the network, the apparatus selection means excludes from the selection targets a specific image forming apparatus that is registered in the exclusion table. Here, as an exclusion condition to be registered in the exclusion table, for example, a condition is conceivable such that an image forming apparatus installed in a location far from the location of the user, i.e. the installation location of the image document creation apparatus used by the user, is made an exclusion target. In other words, whether a location is near or far is used is an exclusion condition.

Also, in the image document creation apparatus of the present invention, a configuration may be adopted in which a trouble information acquisition means is further provided that acquires trouble information of the image forming apparatuses from the image forming apparatuses, and prior to selection of the color gamut information possessed by the image forming apparatuses on the network, the apparatus selection means excludes from the selection targets an image forming apparatus that is having trouble, based on the information acquired by the trouble information acquisition means. That is, from the point in time that the image document creation apparatus is connected to the network, the image document creation apparatus periodically communicates with each image forming apparatus, and by acquiring trouble information (such as out of paper, out of toner, or jammed) of each image forming apparatus, the latest trouble information is always saved. Thus, prior to selection of the color gamut information possessed by the image forming apparatuses on the network, the apparatus selection means is capable of excluding from the selection targets an image forming apparatus that is having trouble, based on the saved trouble information.

Also, in the image document creation apparatus of the present invention, a configuration may be adopted in which when there are two or more image forming apparatuses for which the color difference calculated with the color difference calculation means is within an allowable range that has been set in advance, the apparatus selection means selects one image forming apparatus from among the plurality of image forming apparatuses according to a priority order that has been set in advance. Here, as an example of the priority order, for example, it is conceivable to set a priority order such that an image forming apparatus closer to the location of the user, i.e. the installation location of the image document creation apparatus used by the user, has a higher priority. A configuration may be adopted in which this setting can be freely performed by the user.

Also, in the image document creation apparatus of the present invention, a configuration may be adopted in which a usage history information acquisition means is further provided that acquires usage history information of the image forming apparatuses from the image forming apparatuses, and when there are two or more image forming apparatuses for which the color difference calculated with the color difference calculation means is within an allowable range that has been set in advance, the apparatus selection means selects the image forming apparatus with the lowest frequency of use, based on the past usage history of each image forming apparatus acquired with the usage history information acquisition means. In this case, a configuration may be adopted in which the image document creation apparatus periodically communicates with each image forming apparatus regarding the frequency of use of each image forming apparatus, acquires the usage history of each image forming apparatus, and selects the image forming apparatus with the lowest frequency of use based on the acquired usage histories. In this manner, by selecting the image forming apparatus with the lowest frequency of use, it is possible to select the image forming apparatus with the least amount of toner consumption, so it is possible to avoid a problem in which the image forming apparatus runs out of toner during printing and stops.

Also, in the image document creation apparatus of the present invention, a configuration may be adopted in which a usage history information acquisition means is further provided that acquires usage history information of the image forming apparatuses from the image forming apparatuses, and when there are two or more image forming apparatuses for which the color difference calculated with the color difference calculation means is within an allowable range that has been set in advance, the apparatus selection means selects the image forming apparatus with the highest frequency of use, based on the past usage history of each image forming apparatus acquired with the usage history information acquisition means. A configuration may be adopted in which, similar to the above case, the image document creation apparatus periodically communicates with each image forming apparatus regarding the frequency of use of each image forming apparatus, acquires the usage history of each image forming apparatus, and selects the image forming apparatus with the highest frequency of use based on the acquired usage histories. An image forming apparatus with a high frequency of use often is a high quality apparatus that, for example, outputs an attractive image. Accordingly, in the case of, for example, an important document or the like, by selecting an apparatus with a high frequency of use it is possible to create an attractively printed document.

Also, in the image document creation apparatus of the present invention, a configuration may be adopted in which when there are two or more image forming apparatuses for which the color difference calculated with the color difference calculation means is within an allowable range that has been set in advance, the apparatus selection means selects the image forming apparatus that performed printing most recently. More specifically, by saving the history of a fixed period (for example, such as one month) of printing performed in the image document creation apparatus, it is possible to select the image forming apparatus that performed printing most recently.

Also, in the image document creation apparatus of the present invention, a configuration may be adopted in which when there are two or more image forming apparatuses for which the color difference calculated with the color difference calculation means is within an allowable range that has been set in advance, the apparatus selection means selects the image forming apparatus with the lowest frequency of use. More specifically, by saving the history of a fixed period (for example, such as one month) of printing performed in the image document creation apparatus, it is possible to select the image forming apparatus that has the lowest frequency of use during the past month.

Also, in the image document creation apparatus of the present invention, a configuration may be adopted in which the color difference calculation means calculates color difference, for example, with a color difference formula employing a well-known color system, based on the colors identified by the identification means and the color gamut information acquired by the color gamut information acquisition means.

Here, it is possible to use a color difference formula that employs the L*a*b* color system standardized by the International Commission on Illumination (CIE) in 1976. More specifically, it is possible to use a color difference formula ($\Delta E^*ab$) between two samples defined by $\Delta L^*$, $\Delta a^*$, and $\Delta b^*$, which are the difference in the coordinates L*, a*, b* in the L*a*b* color system.

$$\Delta E^*ab = [(\Delta L^*)^2 + (\Delta a^*)^2 + (\Delta b^*)^2]^{1/2}$$

This color difference formula is also described in, for example, AIC 2004 Color and Paints, Interim Meeting of the International Color Association, Proceedings p 138-142, Industrial colour difference evaluation: LCAM textile data, Michal Vik, Colour and Appearance Measurement Laboratory Faculty of Textile Science, Technical University of Liberec.

Also, the present invention provides a method for printing an image document in an image document creation apparatus provided so as to be connectable to a plurality of image forming apparatuses that have been arranged on a network, the method including a step of acquiring color gamut information possessed by the image forming apparatuses via the network; a step of identifying colors included in document data and/or image data saved in the image document creation apparatus; a step of calculating, for each of the image forming apparatuses, a color difference between the identified colors and the acquired color gamut information; a step of selecting an image forming apparatus with the smallest color difference as a print target based on the calculated color difference; and a step of instructing the selected image forming apparatus to print the document data and/or the image data.

With this configuration, it is possible to obtain the color difference between the color gamut of each image forming apparatus and the colors possessed by document data and/or image data to be printed, select the image forming apparatus capable of expressing colors nearest to the colors possessed by the document data and/or print data based on the obtained color differences, and thus print automatically. In other words, it is possible to print with colors that are closer to the colors included in the document data and/or image data.

Also, the present invention provides a method for printing an image document in an image document creation apparatus provided so as to be connectable to a plurality of image forming apparatuses that have been arranged on a network, in which the image document creation apparatus is provided with a color difference table in which color difference perception messages corresponding to a plurality of color differences have been registered in advance, and the method includes: a step of acquiring color gamut information possessed by the image forming apparatuses via the network; a step of identifying colors included in document data and/or image data saved in the image document creation apparatus; a step of calculating, for each of the image forming apparatuses, a color difference between the identified colors and the acquired color gamut information; and a step of comparing the calculated color difference to the color difference table, extracting a color difference perception message that corresponds to the calculated color difference from the color difference table, and showing the extracted color difference perception message to a user.

With this configuration, prior to printing, it is possible to know the extent of the color difference between colors included in the document data and/or image data to be printed and colors that are actually printed with an image forming apparatus, and so the user can select whether or not to print the document data and/or image data with an awareness of the extent of the color difference.

Also, the present invention can be provided as a program for printing an image document that causes a computer to execute each step of the above method for printing an image document, and furthermore, the present invention can be provided by recording this program for printing an image document on a computer-readable recording medium.

BRIEF DESCRIPTION OF THE DRAWINGS

FIG. 3 is an explanatory diagram that shows an example configuration of a color difference table stored in a memory unit of an image document creation apparatus according to an embodiment of the present invention.

DESCRIPTION OF THE PREFERRED EMBODIMENTS

Hereinafter, embodiments of the present invention will be described in detail with reference to the accompanying drawings.

Figure 1:
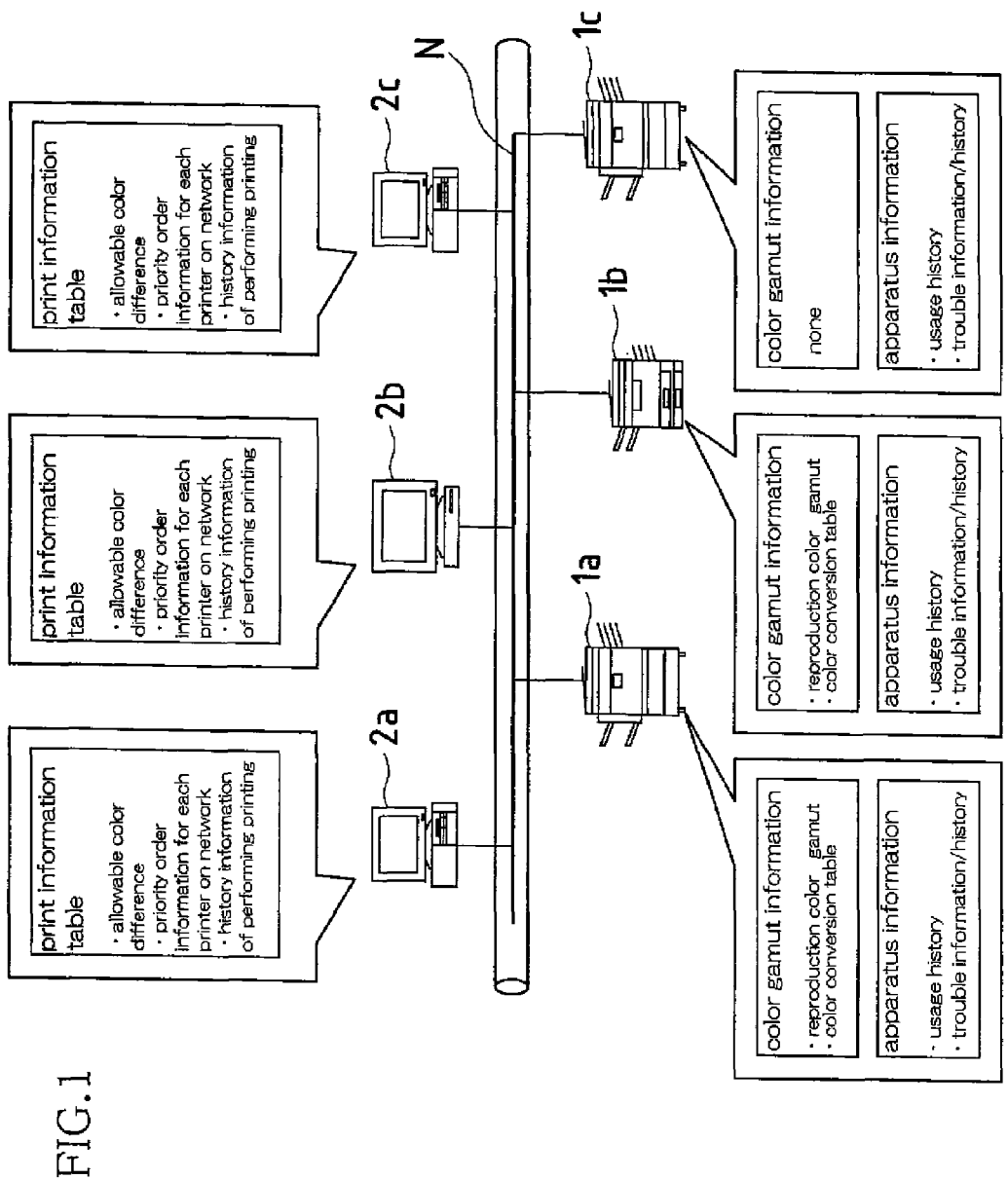
FIG. 1 is a conceptual view that shows the overall configuration of a printing system that includes an image document creation apparatus according to an embodiment of the present invention.

FIG. 1 is a conceptual view that shows the overall configuration of a printing system that includes an image document creation apparatus of the present invention.

In the printing system of the present embodiment, a plurality (only three are shown in FIG. 1 in this example) of printers 1 (1a to 1c) and a plurality (only three are shown in FIG. 1 in this example) of image document creation apparatuses 2 (2a to 2c) are connected via a communications network N. A designated printer 1 receives print data sent from an image document creation apparatus 2, and executes print processing. In the following description, the appended reference letters in parentheses are appropriately used when necessary to distinguish among the printers 1 and among the image document creation apparatuses 2.

<Printers>

Each printer 1 is an image forming apparatus such as an inkjet printer, a copy machine, a multifunction printer, or a printing device. By way of example, in FIG. 1 each image document creation apparatus 2 is shown as a desktop computer, but each image document creation apparatus 2 may also be a notebook computer. The communications network N is a network such as a LAN (Local Area Network), a WAN (Wide Area Network), or the Internet, and the network is constructed as a wired network or as a wireless network.

Figure 2:
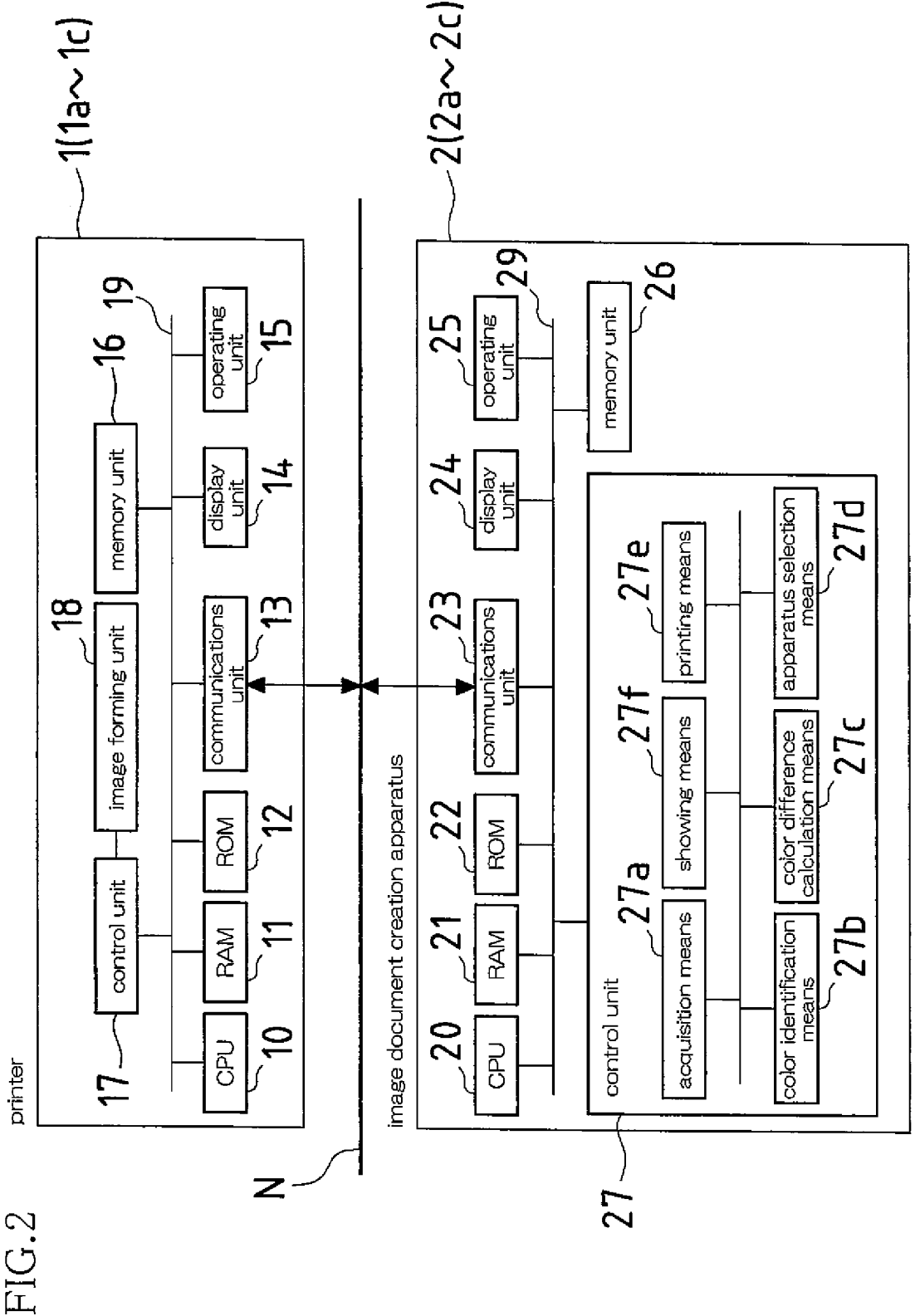
FIG. 2 is an explanatory diagram that shows an overview of the internal configuration of a printer and the image document creation apparatus in the printing system shown in FIG. 1.

FIG. 2 is an explanatory diagram that shows an overview of the internal configuration of a printer 1 and an image document creation apparatus 2 in the printing system shown in FIG. 1.

The printer 1 is configured with a CPU 10, a RAM 11, a ROM 12, a communications unit 13, a display unit 14, an operating unit 15, a memory unit 16, a control unit 17, and an image forming unit 18, and these are connected via a bus 19.

The CPU 10 reads a control program and various processing programs stored in the ROM 12 and opens them in a work area (not shown) within the RAM 11, and controls each unit of the printer 1 according to the opened program. The RAM 11 is a temporary storage area for the programs read from the ROM 12, input data or output data, parameters, and the like in various processing executed and controlled by the CPU 10.

The communications unit 13 is a communications interface that complies with the communications standards of the communications network N. The communications unit 13 is configured with a communications control card such as, for example, a LAN card, and performs sending/receiving and input/output of various data between the printer 1 and the image document creation apparatuses 2 connected to the communications network N via a communications line such as a LAN cable.

The operating unit 15 is configured from an input apparatus such as a tablet, and receives instructions or input from the user that uses the printer 1. The display unit 14 is configured from a display apparatus such as a liquid crystal display, and displays information input via the operating unit 15 or the communications unit 13.

The memory unit 16 is configured from a nonvolatile memory such as an EEPROM or a flash memory, or a hard disk drive (HDD) or the like, and temporarily stores print data that has been sent from the image document creation apparatus 2. Also stored in the memory unit 16 is color gamut information such as reproduction color gamut information and a color conversion table, and apparatus information such as trouble information that the printer 1 has run out of toner or paper, or a jam or breakdown has occurred, and usage history information. The trouble information stores a present state, and when trouble has been eliminated, remains as history, but is deleted from the memory unit 16 as trouble information. A color profile defined by the ICC (International Color Consortium) can be used as the color conversion table, but it is not absolutely necessary to use an ICC color profile as long as an ICC-compliant color profile is used. However, all of the printers do not necessarily themselves possess such color gamut information of a reproduction color gamut and a color conversion table. In this embodiment, as shown in FIG. 1, it is assumed that the printer 1c does not possess this color gamut information.

The control unit 17 controls the image forming unit 18 according to a print instruction from the image document creation apparatus 2, and executes print processing. The image forming unit 18, although not shown, is configured from an exposure unit, a development apparatus, a photosensitive drum, a charging unit, a cleaning unit, a transfer unit, a fixing unit, a paper transport path, a paper supply tray, a discharge tray, and the like.

<Image Document Creation Apparatus>

The image document creation apparatus 2 is configured with a CPU 20, a RAM 21, a ROM 22, a communications unit 23, a display unit 24, an operating unit 25, a memory unit 26, and a control unit 27, and these are connected via a bus 29.

The CPU 20 reads a control program and various processing programs stored in the ROM 22 and opens them in a work area (not shown) within the RAM 21, and controls operation of each unit of the apparatus according to the opened program.

The communications unit 23 is a communications interface that complies with the communications standards of the communications network N. The communications unit 23 is configured with a communications control card such as, for example, a LAN card, and performs sending/receiving and input/output of various data between the image document creation apparatus 2 and the printers 1 connected to the communications network N via a communications line such as a LAN cable.

The RAM 21 is a temporary storage area for the programs read from the ROM 22, input data or output data, parameters, and the like in various processing executed and controlled by the CPU 20.

The control unit 25 is configured with an input apparatus such as a keyboard, a mouse, a tablet, or the like, and receives instructions or input from the user of the image document creation apparatus 2. The display unit 24 is configured from a display apparatus such as a liquid crystal display, and displays information input via the operating unit 25 or the communications unit 23.

The memory unit 26 is configured from a nonvolatile memory such as an EEPROM or a flash memory, or a hard disk drive (HDD) or the like, and saves document data and/or image data or the like that has been created. Also, the memory unit 26 stores a printer driver that has been installed in advance for each printer 1. Also stored in the memory unit 26 are tables related to printing (referred to below collectively as 'printing information tables'), including a color difference table in which color difference perception messages corresponding to a plurality of color differences have been registered in advance, an exclusion table in which information of an image forming apparatus excluded from selection targets has been registered in advance, and a usage history information table in which a usage history of printers used in the past (for example, during the past month) by the image document creation apparatus is stored.

The control unit 27 reads document data and/or image data that has been created and the various information stored in the memory unit 26, generates print data, and sets printing content using a printer driver stored in the memory unit 26. The set print data is sent to a single printer 1 that has been designated via the communications unit 23 and the network N, and is printed/output with the printer 1.

In the above configuration, in the present embodiment, the control unit 27 is provided with an acquisition means 27a that acquires color gamut information and past usage history information, and past trouble information, possessed by each printer 1; a color identification means 27b that identifies colors included in document data and/or image data saved in the image document creation apparatus; a color difference calculation means 27c that calculates, for each printer, a color difference between the identified colors and the color gamut information acquired from each printer 1; an apparatus selection means 27d that selects a printer 1 as a print target based on the calculated color difference; a printing means 27e that outputs a print instruction to the selected printer 1; and a showing means 27f that compares the color difference calculated with the color difference calculation means 27c to the color difference table stored in the memory unit 26, extracts a color difference perception message that corresponds to the calculated color difference from the color difference table, and displays the extracted color difference perception message in the display unit 24.

FIG. 3 is an explanatory diagram that shows an example configuration of a color difference table stored in the memory unit 26.

In the present embodiment, this color difference table is made up of color differences (ΔE) that have been divided into six levels, and color difference perception messages that correspond to the color differences. Specifically, the color differences (ΔE) are divided into six color difference levels of 0, 0 to below 0.5, 0.5 to below 1.5, 1.5 to below 3.0, 3.0 to below 6.0, and 6.0 or greater, and six types of perception messages are associated with the respective color difference levels: Non (no color difference), Trace (faintly perceivable), Slight (slightly perceivable), Noticeable (very perceivable), Appreciable (appreciably perceivable), and Much (large). For example, when the color difference (ΔE) calculated with the color difference calculation means 27c is 2.0, the showing means 27f selects the corresponding message 'very perceivable' and displays this message along with a name or the like of the corresponding image forming apparatus.

Also, as an exclusion condition registered in the exclusion table stored in the memory unit 26, for example, the printer 1 installed in a location far from the location of the user, i.e. the installation location of the image document creation apparatus 2 used by the user, is made an exclusion target. For example, when the image document creation apparatus 2 used by the user is installed on the third floor of an office building, and for example the printers 1a and 1b are also installed on the third floor, but the printer 1c is installed on the fifth floor, the printer 1c installed on the fifth floor is registered in the exclusion table so as to be excluded from the print targets. However, the registration condition is not limited to this sort of locational condition, and may be appropriately determined according to the user's convenience. For example, when the printer 1a is turned off at 6:00 p.m., but another printer 1b is provided with a facsimile function and therefore operates 24 hours per day although switching to a power saving mode, it is possible to register the printer 1a having a short operation time in the exclusion table so as to be excluded from the print targets.

<Operation of Printer Selection Processing>

Next is a description of the operation of printer selection processing when printing document data and/or image data that has been created in the image document creation apparatus with the above configuration, with reference to the flowcharts shown in FIGS. 4 to 15.

Figure 4:
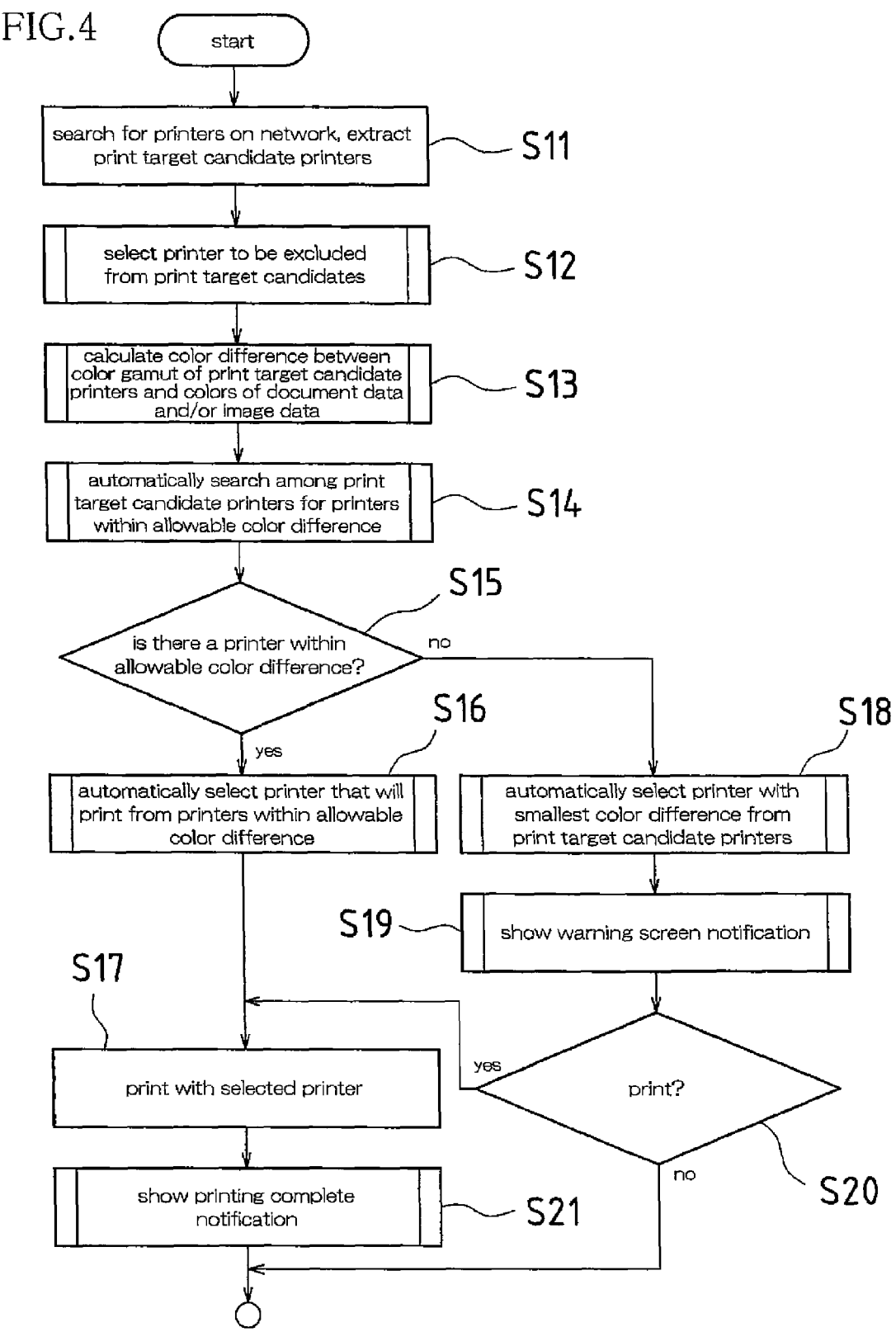
FIG. 4 is a flowchart for describing the basic processing procedure of printer selection processing according to an embodiment of the present invention.
Figure 5:
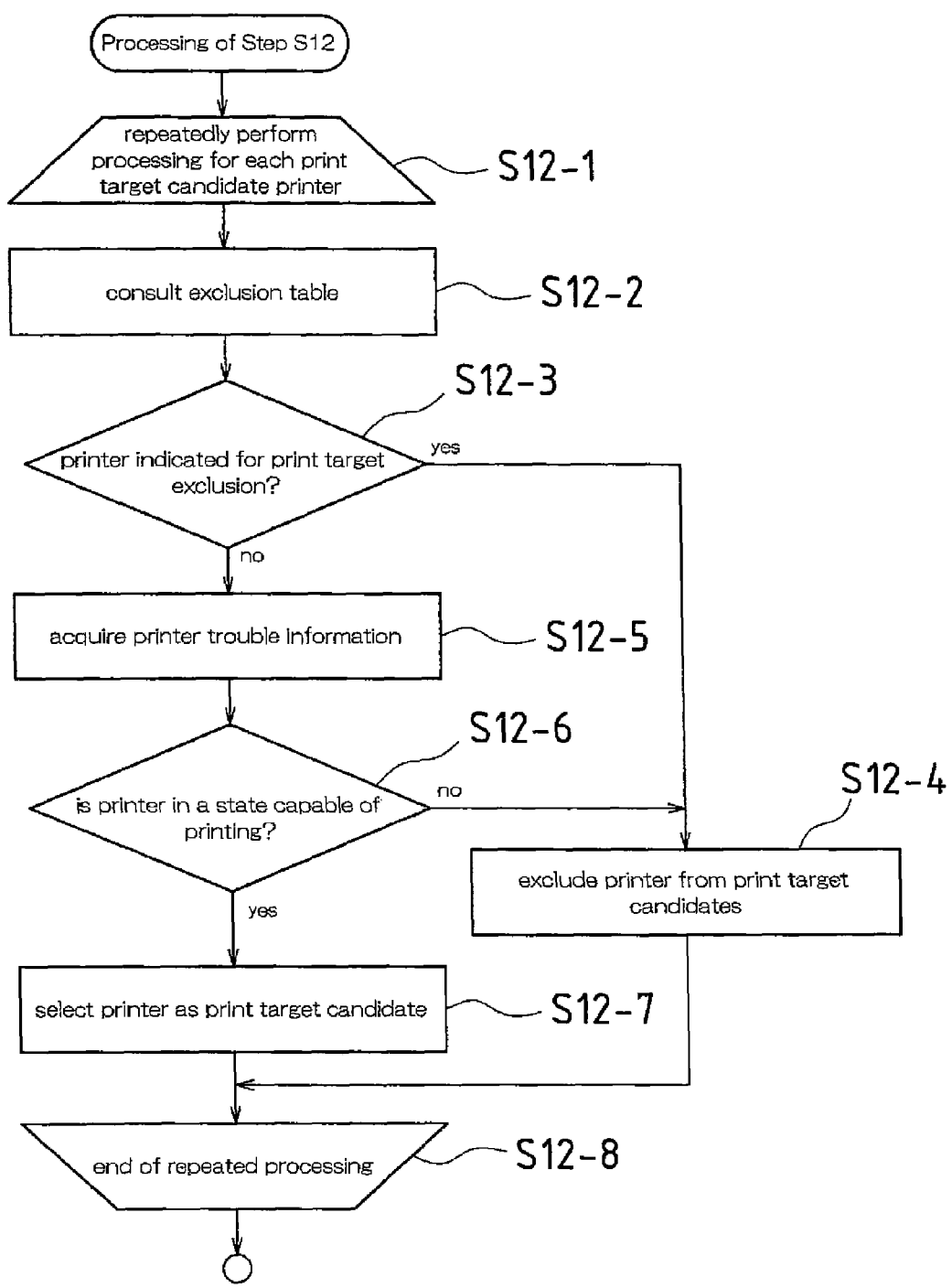
FIG. 5 is a flowchart that shows a more specific example of the processing procedure in Step S12 of the flowchart in FIG. 4.
Figure 6:
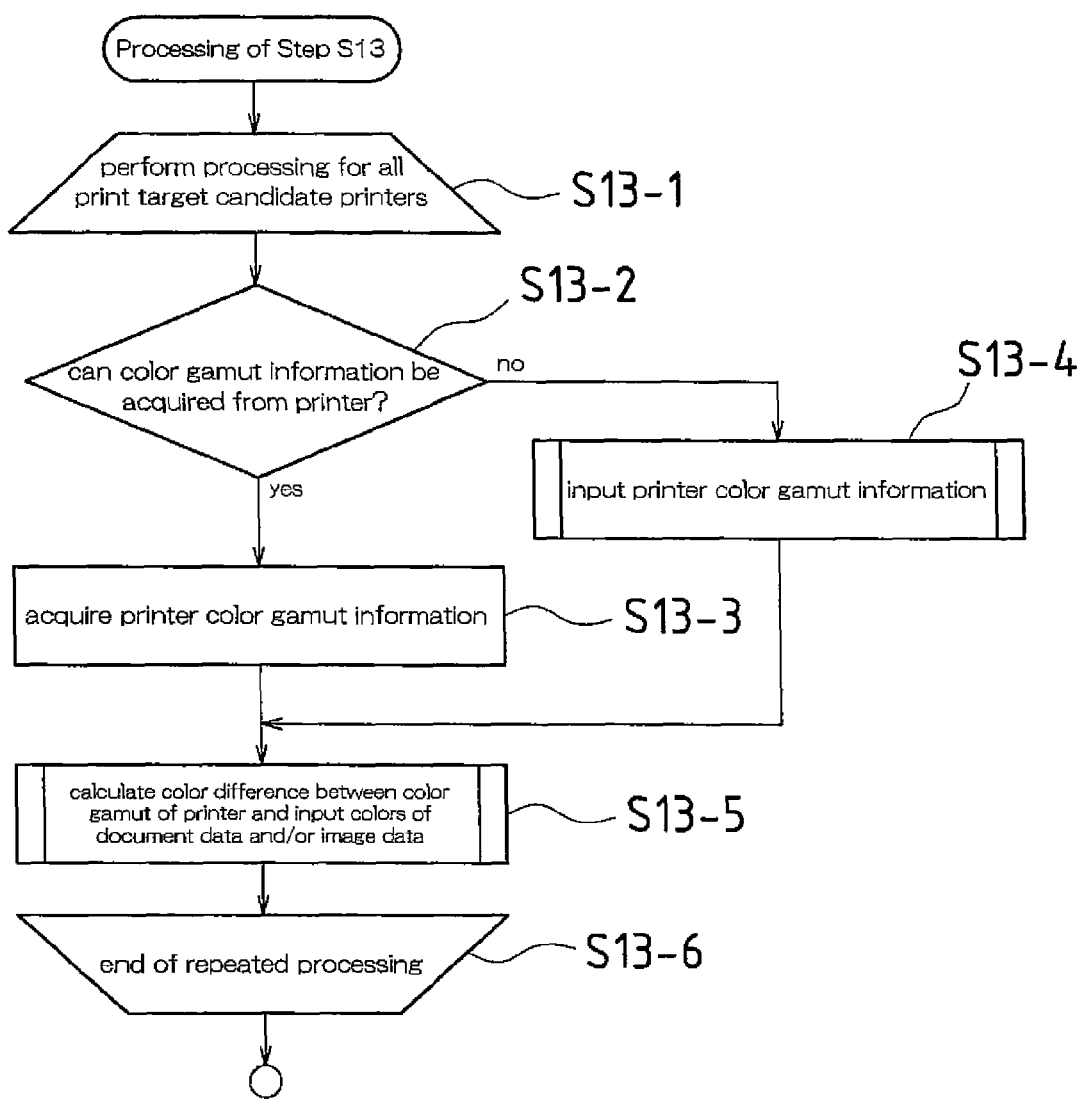
FIG. 6 is a flowchart that shows a more specific example of the processing procedure in Step S13 of the flowchart in FIG. 4.
Figure 7:
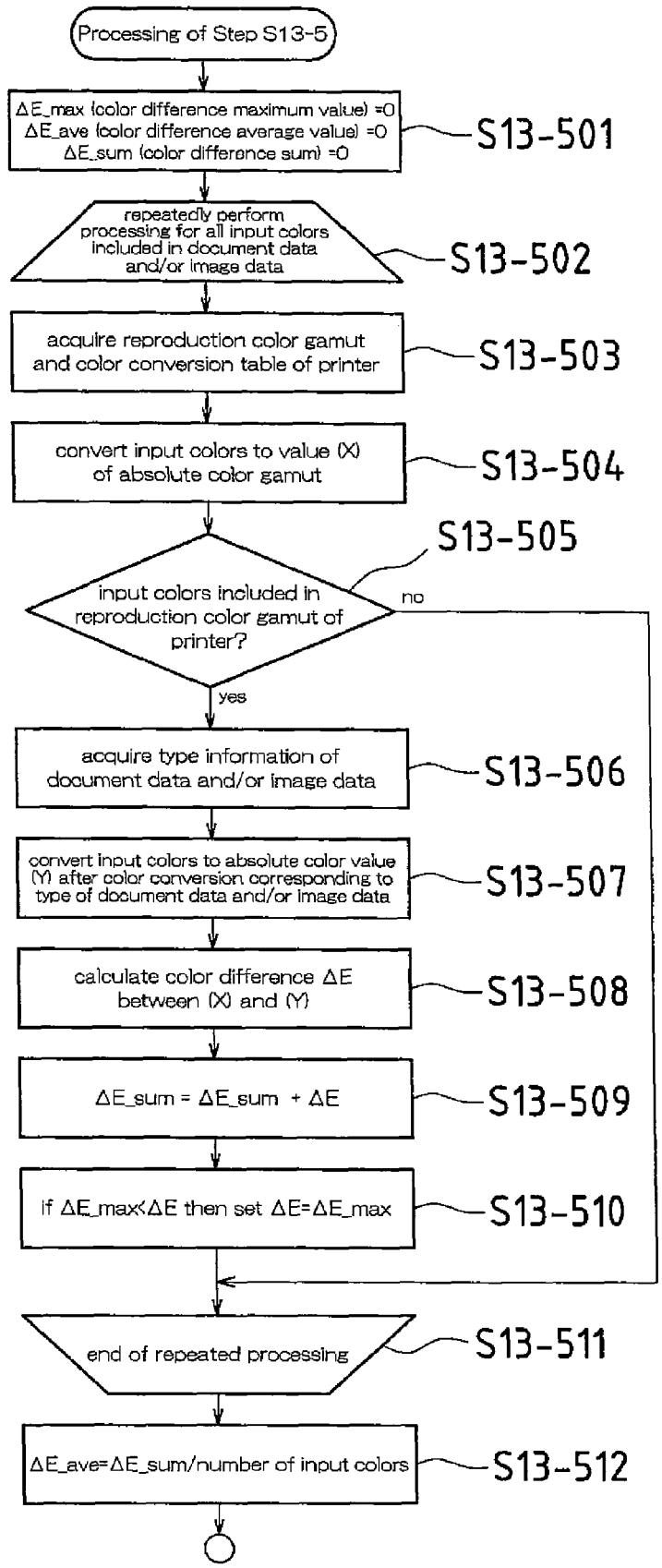
FIG. 7 is a flowchart that shows a more specific example of the processing procedure in Step S13-5 of the flowchart in FIG. 6.
Figure 8:
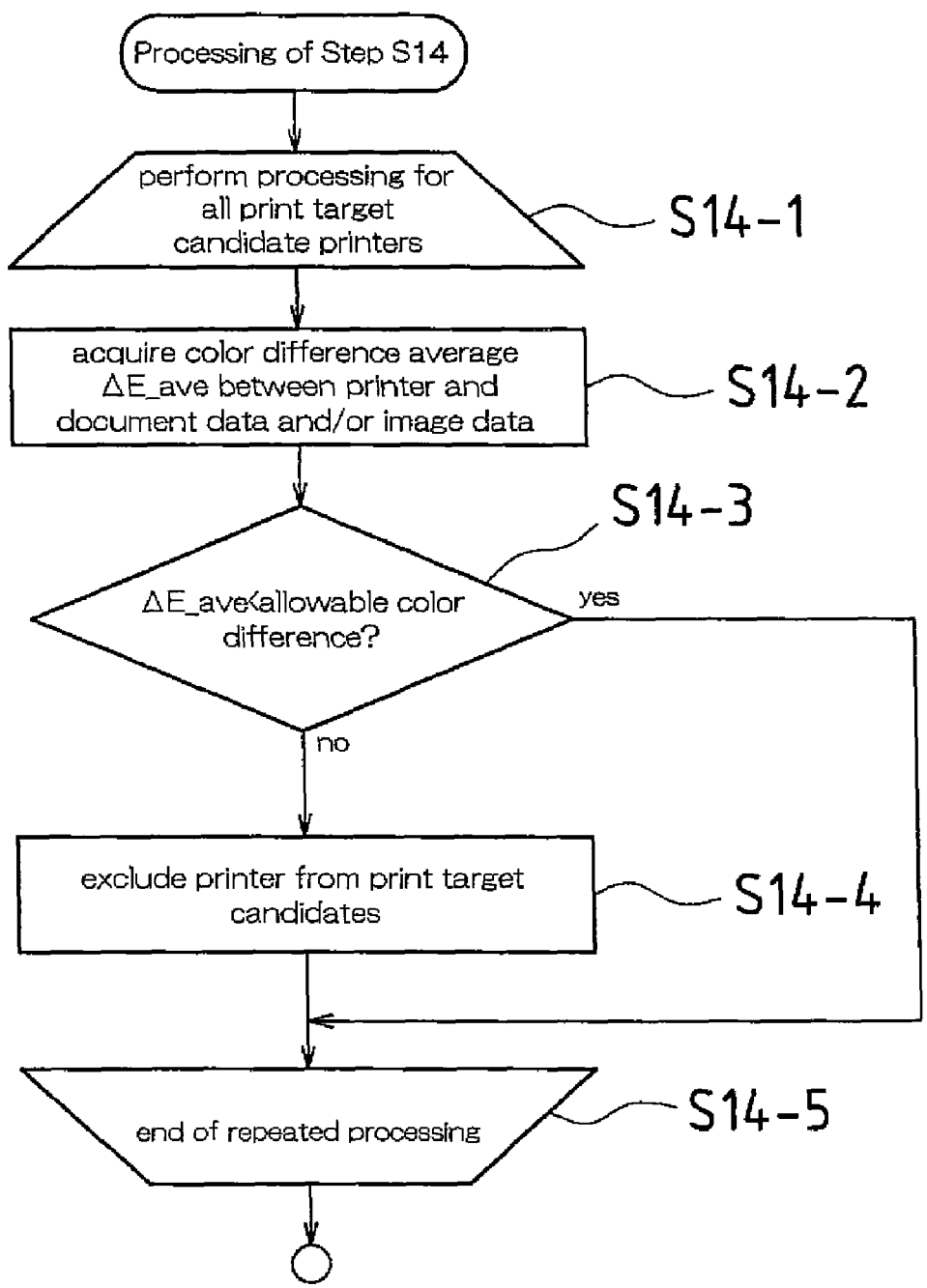
FIG. 8 is a flowchart that shows a more specific example of the processing procedure in Step S14 of the flowchart in FIG. 4.
Figure 9:
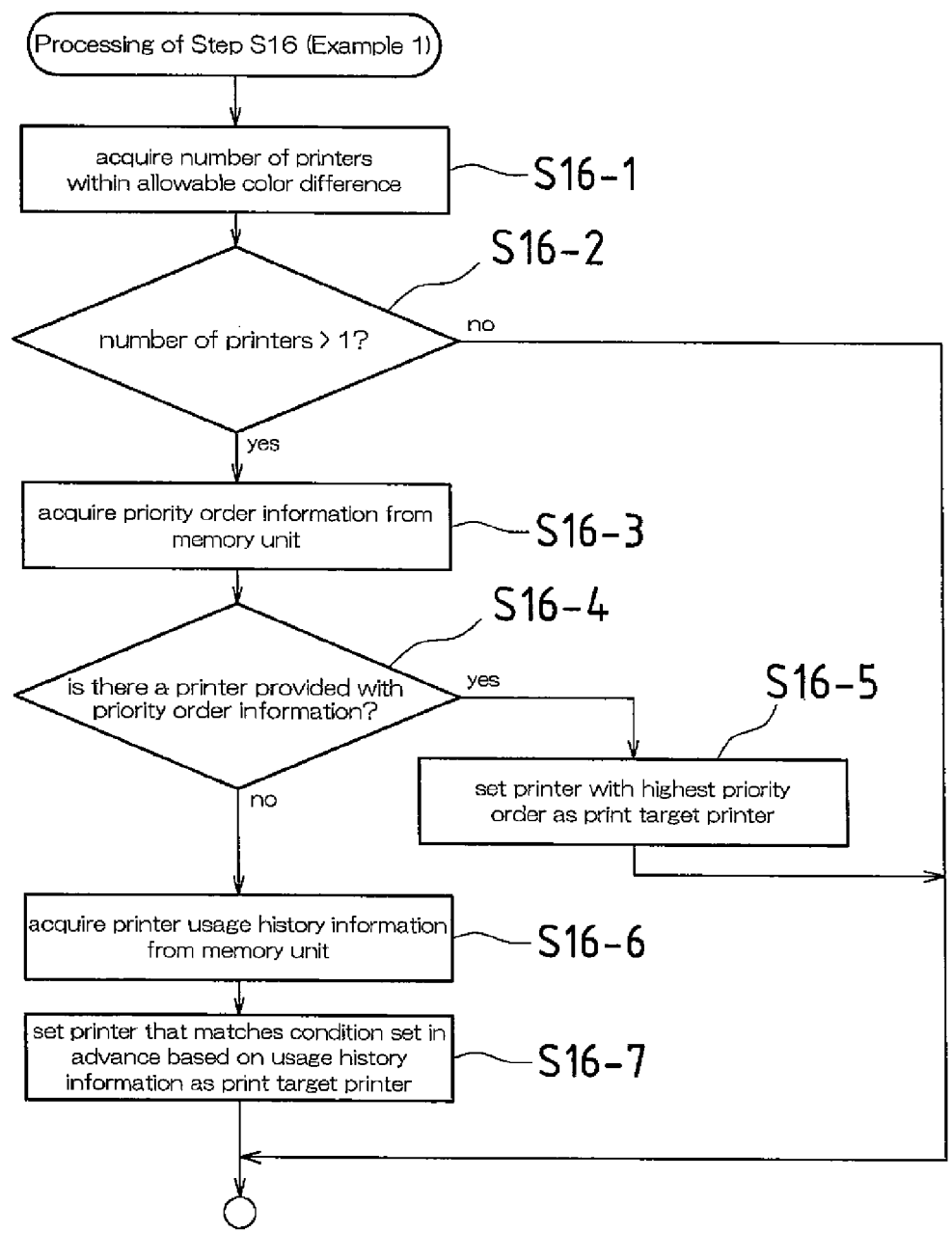
FIG. 9 is a flowchart that shows a more specific example of the processing procedure in Step S16 of the flowchart in FIG. 4.
Figure 10:
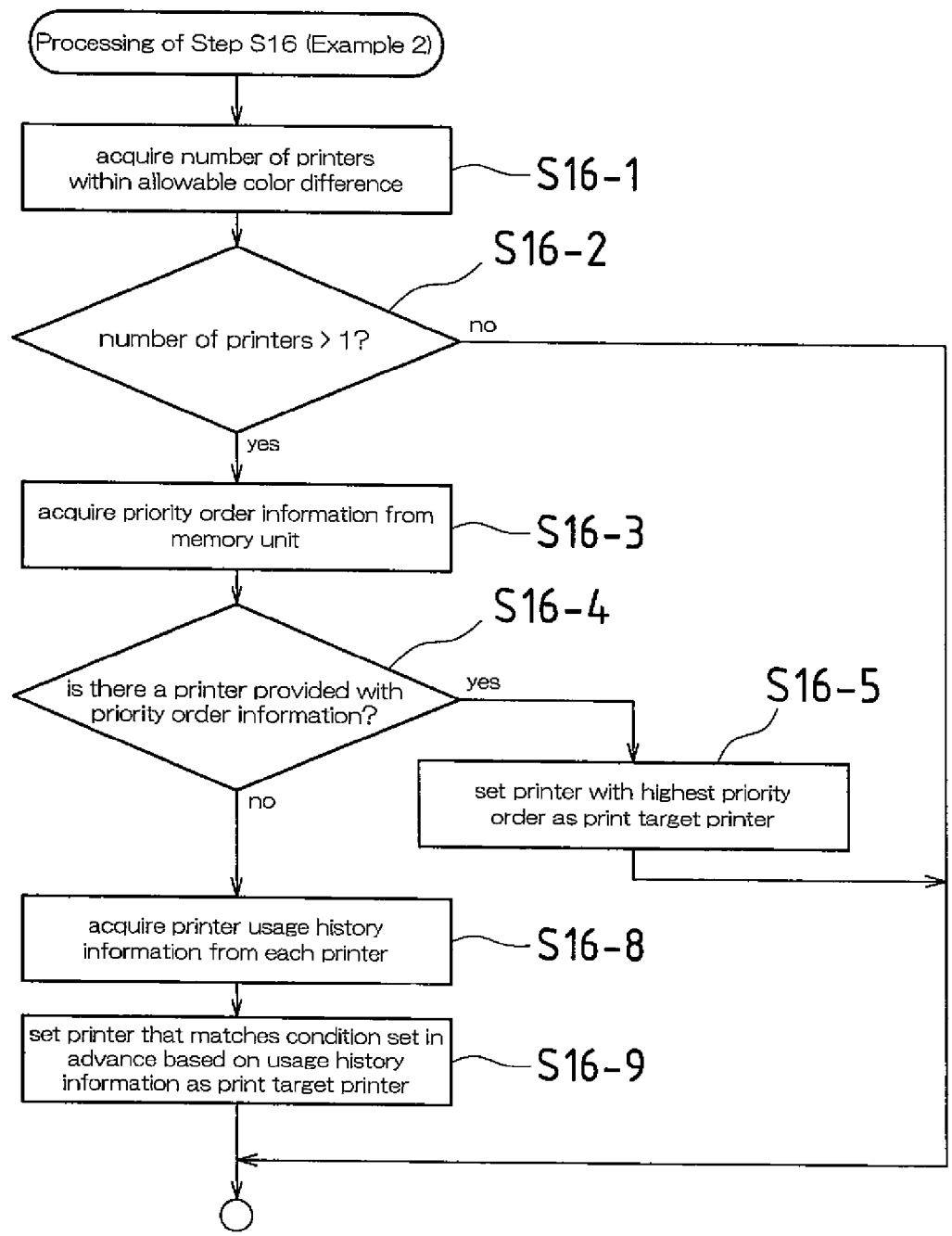
FIG. 10 is a flowchart that shows another more specific example of the processing procedure in Step S16 of the flowchart in FIG. 4.
Figure 11:
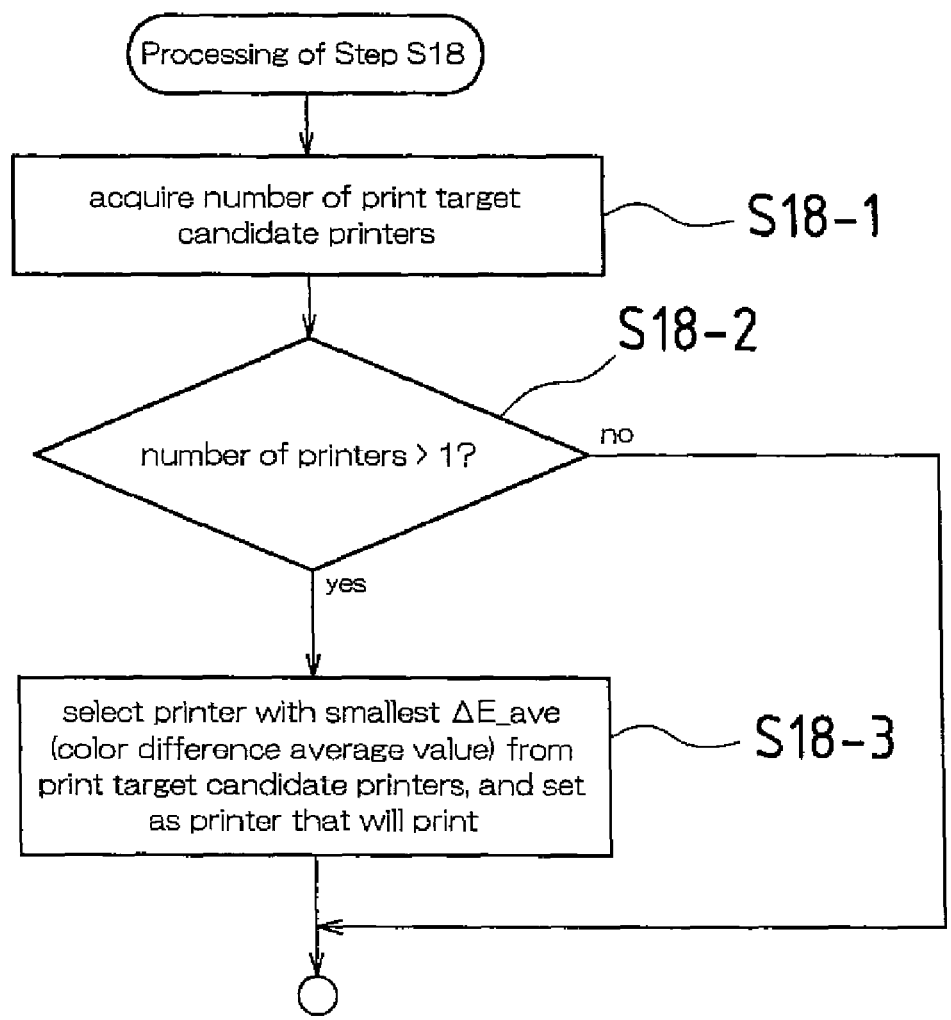
FIG. 11 is a flowchart that shows a more specific example of the processing procedure in Step S18 of the flowchart in FIG. 4.
Figure 12:
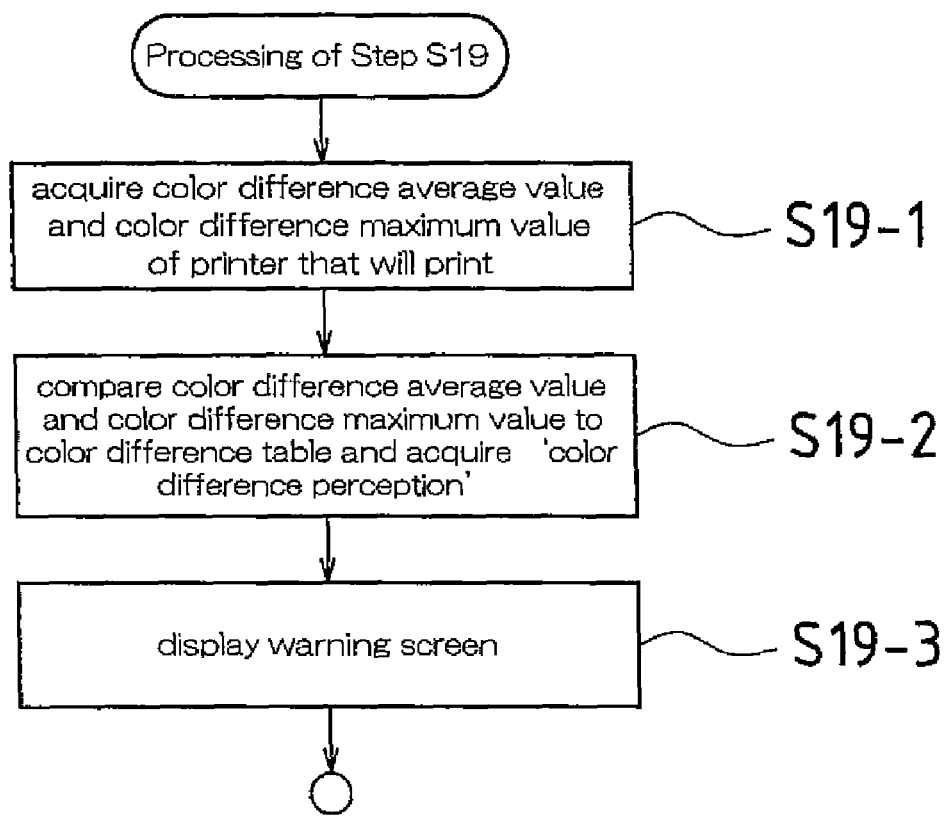
FIG. 12 is a flowchart that shows a more specific example of the processing procedure in Step S19 of the flowchart in FIG. 4.
Figure 13:
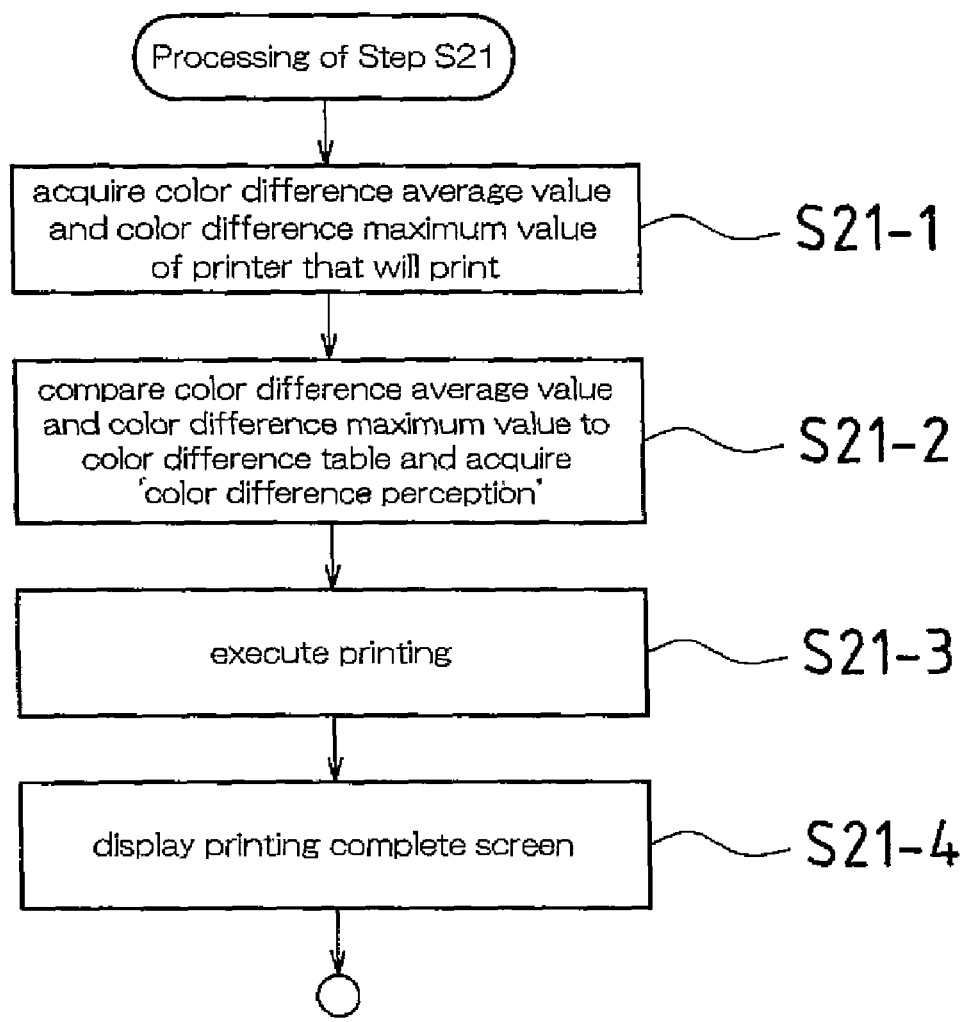
FIG. 13 is a flowchart that shows a more specific example of the processing procedure in Step S21 of the flowchart in FIG. 4.

First, the basic flow of printer selection processing will be described with reference to the flowchart in FIG. 4, after which the specific processing in each step will be separately described.

—Basic Description of Printer Selection Processing (See FIG. 4)—

The image document creation apparatus 2 searches for each printer 1 on the network N, and extracts the printers 1 as print target candidates (Step S11).

Next, the image document creation apparatus 2 selects a printer 1 to be excluded from the print target candidates, and deletes that printer 1 from the print target candidates (Step S12). For example, when the printer 1c is registered in the exclusion table, the printer 1c is excluded from the print target candidates, and the other printers 1a and 1b are extracted as print target candidates. Then, in all of the printers 1 extracted as print target candidates, a color difference between the color gamut of each printer 1 and the colors of document data and/or image data to be printed is calculated with the color difference calculation means 27c (Step S13).

Next, the image document creation apparatus 2 automatically searches for a printer 1 with a color difference in an allowable range from among the print target candidate printers, based on the calculated color differences of the print target candidate printers 1 (Step S14).

When the result of that search is that printers 1 in the allowable range exist (when judged Yes in Step S15), the printer 1 that will print is automatically selected from the printers 1 within the allowable color difference (Step S16), printing is executed with the selected printer 1 (Step S17), and when printing is completed, a printing complete screen is displayed (Step S21).

Figure 14:
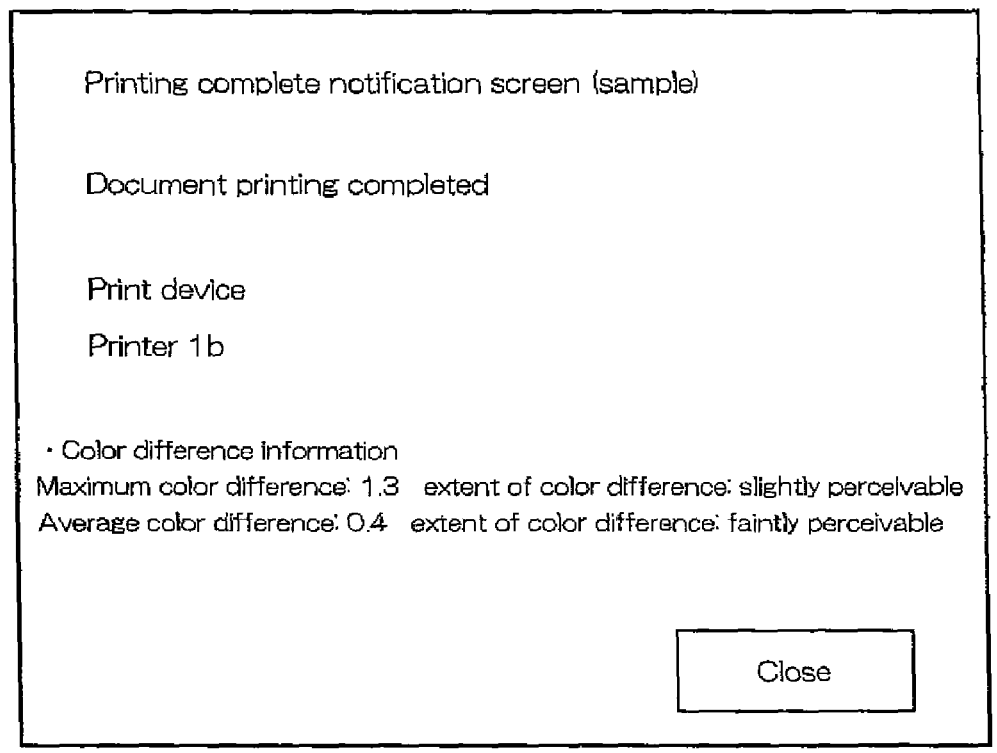
FIG. 14 is an explanatory diagram that shows an example of a printing complete screen displayed in the printer selection processing according to an embodiment of the present invention.

FIG. 14 shows an example of the printing complete screen displayed at this time.

In this printing complete screen, a printing complete message is displayed above, the printer device that executes printing is displayed in the middle, and details of color difference information including a message (described below) regarding the 'color difference perception' are displayed below.

On the other hand, when the result of that search is that a printer 1 in the allowable range does not exist (when judged No in Step S15), the color difference of each print target candidate printer 1 is compared, the printer 1 with the smallest color difference is automatically selected (Step S18), and then a warning screen is displayed in the display unit 24 (Step S19) and thus shown to the user.

When the user has selected print execution in response to being shown this display (when Judged Yes in Step S20), printing is executed with the selected printer 1 (Step S17), and when printing is completed, the printing complete screen is displayed (Step S21). On the other hand, when the user has not selected print execution in response to the warning (when judged No in Step S20), printing is not executed, and in that state processing is ended.

The foregoing is a description of the basic processing procedure of the printer selection processing. Following is a separate description of each step of the processing.

—Processing in Step S12 (See FIG. 5)—

In this processing, the processing of Steps S12-1 to S12-8 is repeatedly performed for each of the print target candidate printers 1 that were extracted in Step S11.

More specifically, the exclusion table stored in the memory unit 26 is consulted (Step S12-2), and a judgment is made of whether or not any particular printer 1 on the network N is registered as a printer to be excluded from the print targets (Step S12-3). When the result is that the particular printer 1 on the network N is registered as an exclusion target (when judged Yes in Step S12-3), that printer 1 is excluded from the print target candidates (Step S12-4).

On the other hand, when the result is that the particular printer 1 on the network N is not registered as an exclusion target (when Judged No in Step S12-3), then next, trouble information is acquired from that printer 1 (Step S12-5), and a judgment is made of whether or not that printer 1 is in a state capable of printing (Step S12-6). When the result of that judgment is that the printer 1 is in a state incapable of printing (i.e., a state in which the acquired trouble information includes information that a jam, a breakdown, or the like has occurred in the printer 1, or information that the printer 1 is out of ink or paper or the like) (when judged No in Step S12-6), that printer 1 is excluded from the print target candidates (Step S12-4).

On the other hand, when the result of that judgment is that the printer 1 is in a state capable of printing (i.e., a state in which the acquired trouble information does not include information that a jam, a breakdown, or the like has occurred in the printer 1, or information that the printer 1 is out of ink or paper or the like) (when judged Yes in Step S12-6), that printer 1 is selected as a print target candidate (Step S12-7).

—Processing in Step S13 (See FIG. 6)—

In this processing, the processing of Steps S13-1 to S13-6 is repeatedly performed for each of the print target candidate printers 1 that were selected in Step S12.

More specifically, the acquisition means 27a communicates with any particular printer 1 among the print target candidates, and judges whether or not it is possible to acquire color gamut information (Step S13-2). If the result of that judgment is that color gamut information can be acquired (if judged Yes in Step S13-2), the color gamut information of that printer 1 is acquired (Step S13-3). The acquired color gamut information is, for example, stored in a predetermined area of the memory unit 26.

On the other hand, when the result of that judgment is that color gamut information cannot be acquired (for example, the printer 1c does not possess color gamut information)(when judged No in Step S13-2), the user independently inputs color gamut information for that printer 1 (Step S13-4). For example, color gamut information such as a reproduction color gamut or a color conversion table is publicly released at a website or the like of the manufacturer of that printer 1 (for example, the printer 1c), so the publicly released information can be acquired by downloading.

Afterward, the color difference between the acquired color gamut information and the colors included in the document data and/or image data to be printed are calculated using, for example, a color difference formula that employs the L*a*b* color system (Step S13-5). Here, the color difference calculation processing will be specifically described.

—Processing in Step S13-5 (Color Difference Calculation Processing) (See FIG. 7)—

First, $\Delta E\_max$ (color difference maximum value), $\Delta E\_ave$ (color difference average), and $\Delta E\_sum$ (color difference sum) are each initialized (set to 0) (Step S13-501). Then, the processing of Steps S13-502 to S13-511 is performed for all input colors included in the document data and/or image data.

That is, in Step S13-503, the reproduction color gamut and color conversion table of the printer 1 are acquired.

In Step S13-504, input colors are converted to a value of an absolute color gamut. This value is represented by (X).

In Step S13-505, the value (X) and the reproduction color gamut of the printer 1 are compared. When the value (X) is included in the reproduction color difference of the printer 1 (when judged Yes in Step S13-505), the processing advances to Step S13-506, and when the value (X) is not included in the reproduction color difference of the printer 1 (when Judged No in Step S13-505), the processing advances to Step S13-511.

In Step S13-506, type information (information indicating photograph, graphic, text, or the like) of the document data and/or image data to be printed is acquired.

In Step S13-507, the input colors of the document data and/or image data is color-converted according to the type of document data and/or image data obtained in Step S13-506 (e.g., Perceptual or Saturation conversion), and a value after color conversion are converted to an absolute value. This value is represented by (Y).

In Step S13-50S, the color difference between the value (X) and the value (Y) is calculated using the color difference formula ($\Delta E$). The obtained value is represented by $\Delta E$.

In Step S13-509, the color difference sum ($\Delta E\_sum$) is obtained according to formula (1) below.

$$\Delta E\_sum = \Delta E\_sum + \Delta E \quad (1)$$

In Step S13-510, $\Delta E = \Delta E\_max$ when $\Delta E\_max < \Delta E$.

Step S13-511 is the last step in the above processing.

In Step S13-512, the color difference average value ($\Delta E\_ave$) is calculated from the ($\Delta E\_sum$) obtained above and the number of input colors, using formula (2) below.

$$(\Delta E\_ave) = (\Delta E\_sum)/\text{number of input colors} \quad (2)$$

—Processing in Step S14 (See FIG. 8)—

In this processing, the processing of Steps S14-1 to S14-5 is performed for each of the print target candidate printers 1 that were selected in Step S12, using the color difference average value ($\Delta E\_ave$) for each printer 1 calculated in Step S13 above.

More specifically, in Step S14-2, the color difference average value $\Delta E\_ave$ between a printer and document data and/or image data calculated in Step S13 is acquired.

In Step S14-3, the acquired color difference average value $\Delta E\_ave$ is compared to the six levels of color difference registered in the color difference table, and a judgment is made of whether or not $\Delta E\_ave$ is within the allowable range. Here, the allowable range is a range of 1 to 1.5, as described above. When the result of that judgment is that $\Delta E\_ave$ is within the allowable range (when judged Yes in Step S14-3), the processing proceeds to Step S14-5, and when the result of that judgment is that $\Delta E\_ave$ is outside of the allowable range (when judged No in Step S14-3), the processing proceeds to Step 14-4.

In Step S14-4, a printer 1 that is outside of the allowable range is excluded from the print target candidates. When the processing proceeded from Step S14-3 to Step S14-5, that printer 1 is selected as a print target candidate.

—Processing in Step S16 (Example 1) (See FIG. 9)—

In Step S16-1, the number of printers 1 within the allowable color difference obtained in Step S14 is acquired.

In Step S16-2, a judgment is made of whether or not the number of printers 1 acquired is greater than one, i.e. whether or not a plurality of printers 1 were acquired. When the result of that judgment is that only one printer 1 was acquired (when judged No in Step S16-2), the processing in Step S16 ends. On the other hand, when the result of that judgment is that a plurality of printers 1 were acquired (when judged Yes in Step S16-2), the processing proceeds to Step S16-3.

In Step S16-3, priority order information is acquired from the memory unit 26. By way of example, it is conceivable to set a priority order such that a printer 1 closer to the location of the user, i.e. the installation location of the image document creation apparatus 2 used by the user, has a higher priority. However, the priority order is not limited to having such a locational condition, and may be appropriately set according to the convenience of the user. For example, when the printer 1a is turned off at 6:00 p.m., but another printer 1b is provided with a facsimile function and therefore operates 24 hours per day although switching to a power saving mode, it is possible to set the printer 1b with a long operation time to have a higher priority, and set the printer 1a with a short operation time to have a lower priority. A configuration may be adopted in which this sort of priority order can be freely set by the user and registered in the memory unit 26.

In Step S16-4, a judgment is made of whether or not there is a printer provided with a priority order. When the result of that judgment is that there is such a printer, the processing proceeds to Step S16-6, and when there is not such a printer, the processing proceeds to Step S16-5.

In Step S16-5, because there is a priority order, the printer with the highest priority order is determined to be the print target printer.

In Step S16-6, because there is not a printer provided with a priority order, next, printer usage history information stored in the memory unit 26 is acquired. This image document creation apparatus is provided with a function to store a usage history of which printer was used when printing was performed in the past in a usage history information table of the memory unit 26, and the printer usage history information is acquired from this usage history information table. Here, the usage history information includes information such as print time and the number of times a printer was used in the past month.

In Step S16-7, a printer that matches a condition that has been set in advance is selected as the print target printer, based on the usage history information acquired for each printer.

Here, three conditions are conceivable as a condition that has been set in advance: a condition that the last printer to perform printing is selected as the print target printer, based on the print time information included in the usage history (condition 1); a condition that the printer with the highest frequency of use (highest number of times used) is selected as the print target printer, based on the number of times each printer was used in the past month, included in the usage history (condition 2); and a condition that the printer with the lowest frequency of use (fewest number of times used) is selected as the print target printer, based on the number of times each printer was used in the past month, included in the usage history (condition 3).

——Processing in Step S16 (Example 2) (See FIG. 10)——

In Example 2, the processing from Steps S16-1 to S16-5 is the same as in Example 1 above, so a description of those steps is omitted here.

In Step S16-8, because there is not a printer provided with a priority order, next, printer usage history information is acquired from each printer 1 on the network N (only the printers within the allowable color difference obtained in Step S14) by communicating with each printer 1.

In Step S16-9, a printer that matches a condition that has been set in advance is selected as the print target printer, based on the usage history information acquired for each printer.

Here, two conditions are conceivable as a condition that has been set in advance: a condition that the printer with the highest frequency of use (highest number of times used) is selected as the print target printer, based on the number of times each printer was used in the past month, included in the usage history (condition 4); and a condition that the printer with the lowest frequency of use (fewest number of times used) is selected as the print target printer, based on the number of times each printer was used in the past month, included in the usage history (condition 5).

When (condition 4) has been set, a printer with a high frequency of use often is a high quality printer that, for example, outputs an attractive image. Accordingly, in the case of, for example, an important document or the like, by setting the condition so as to select a printer with a high frequency of use it is possible to create an attractively printed document. Also, when (condition 5) has been set, a printer with a low frequency of use also has a low amount of toner consumption, so it is likely possible to avoid a problem in which the image forming apparatus runs out of toner during printing and stops. Accordingly, it is good to set (condition 5) when, for example, printing in large quantities.

——Processing in Step S18 (See FIG. 11)——

In Step S18-1, the number of print target candidate printers (i.e., the number of printers after excluding printers registered in the exclusion table) obtained in Step S12 is acquired.

In Step S18-2, a judgment is made of whether or not the number of printers 1 acquired is greater than one. When the result of that judgment is that there is more than one such printer 1 (when judged Yes in Step S18), the processing proceeds to Step S18-3. On the other hand, when only one such printer was acquired, the processing ends in this state.

In Step S18-3, the printer having the smallest $\Delta E\_ave$ (color difference average value) among the print target candidate printers is selected, and this printer is determined to be the print execution printer.

——Processing in Step S19 (See FIG. 12)——

In Step S19-1, the color difference average value ($\Delta E\_ave$) and the color difference maximum value ($\Delta E\_max$) are acquired for the print execution printer determined in Step S18.

In Step S19-2, the color difference average value ($\Delta E\_ave$) and the color difference maximum value ($\Delta E\_max$) are compared to the color difference registered in the color difference table, and a corresponding 'color difference perception' message is acquired.

In Step S19-3, print information that includes the acquired 'color difference perception' message is displayed in the display unit 24 as a warning screen.

Figure 15:
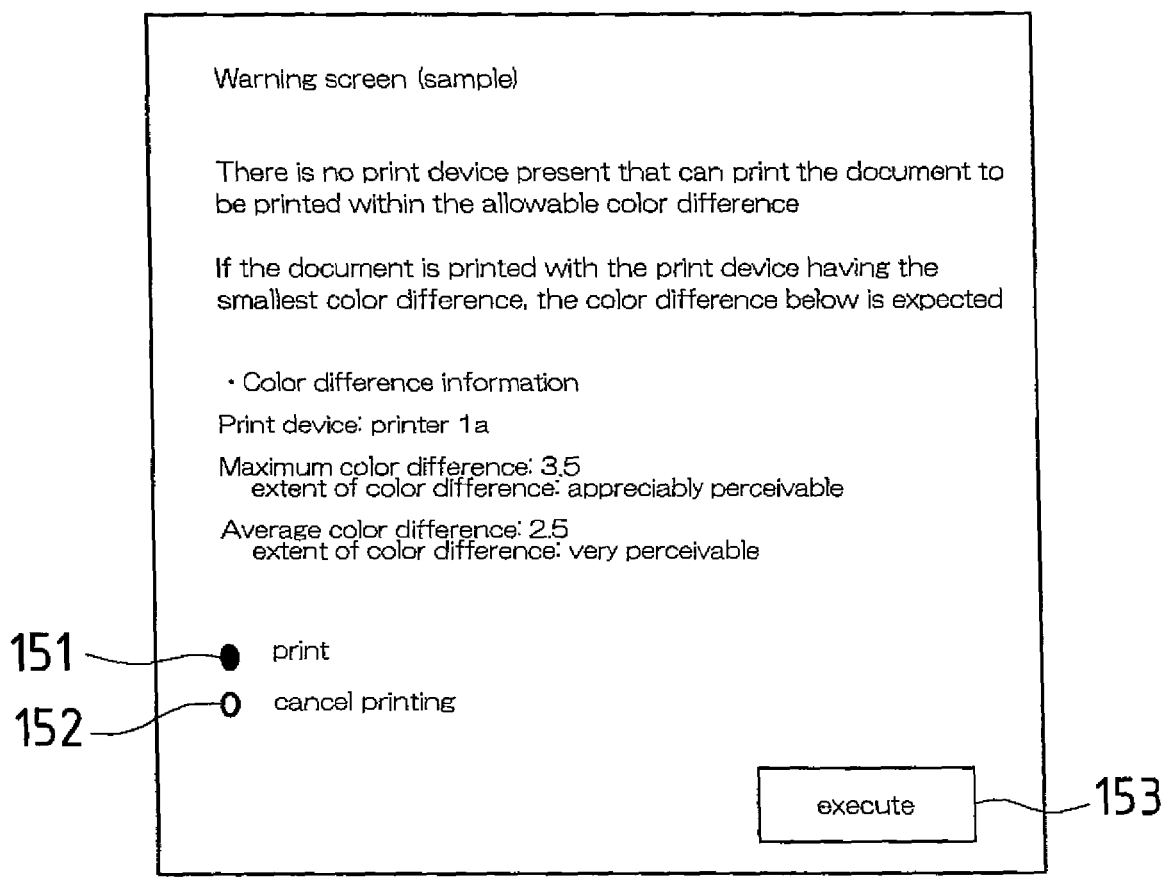
FIG. 15 is an explanatory diagram that shows an example of a warning screen displayed in the printer selection processing according to an embodiment of the present invention.

FIG. 15 shows an example of the displayed warning screen.

In this warning screen, text describing the warning content is displayed above, details of the color difference information are displayed in the middle, a selection screen for selecting whether to execute or cancel printing is displayed below, and an 'execute' button 153 is displayed in the lower right of the screen. Accordingly, when executing printing, by the user placing a check in a selection window 151 (solid black circle in FIG. 15) of the selection screen where 'Print' is written, and selecting the 'execute' button 153, printing is executed with the indicated printer 1a. In other words, the processing proceeds from Step S20 shown in FIG. 4 to Step S17.

——Processing in Step S21 (See FIG. 13)——

In Step S21-1, the color difference average value ($\Delta E\_ave$) and the color difference maximum value ($\Delta E\_max$) are acquired for the print execution printer determined in Step S16 or S20.

In Step S21-2, the color difference average value ($\Delta E\_ave$) and the color difference maximum value ($\Delta E\_max$) acquired in Step S21-1 are compared to the color difference registered in the color difference table, and a corresponding 'color difference perception' message is acquired.

In Step S21-3, printing is executed with the selected printer 1.

In Step S21-4, when printing ends, print information that includes the 'color difference perception' message acquired in Step S21-3 is displayed in the display unit 24 as a printing complete screen. One example of the printing complete screen at this time is as shown in FIG. 14, and the contents of the display of color difference information are the contents shown in the warning screen (FIG. 15).

A program for carrying out the processing flow shown in FIGS. 4 to 13 described above is stored on a computer-readable recording medium. In the present embodiment, this program is stored in the ROM 22, but examples of such a recording medium include a mask ROM (Read Only Memory), a semiconductor memory element such as a flash memory, a hard disk, a flexible disk, an MO disk (magneto-optical disk), a CD-ROM (Compact Disc Read Only Memory), a DVD-ROM (Digital Versatile Disc Read Only Memory), an IC (Integrated Circuit) card, a magnetic tape, and the like. Also, a configuration may be adopted in which the program itself is transferred via communications and recorded to a recording medium.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image document creation apparatus provided so as to be connectable to a plurality of image forming apparatuses that have been arranged on a network, the image document creation apparatus comprising:

a color gamut information acquisition unit that acquires color gamut information possessed by the image forming apparatuses;

an identification unit that identifies input colors included in document data and/or image data saved in the image document creation apparatus;

a color difference calculation unit that performs, for each of the image forming apparatuses, processing to obtain a color difference sum and a color difference maximum value by calculating a color difference between the input colors identified by the identification unit and the color gamut information acquired by the color gamut information acquisition unit, and processing to obtain a color difference average value based on the obtained color difference sum and the number of input colors;

an apparatus selection unit that selects an image forming apparatus as a print target based on the color difference average value obtained by the color difference calculation unit;

a printing unit that instructs the selected image forming apparatus to print the document data and/or the image data;

a color difference table in which color difference perception messages corresponding to a plurality of color differences have been registered in advance; and a showing unit comparing, respectively to the color difference table, the color difference average value and the color difference maximum value obtained with the color difference calculation unit relative to the image forming apparatus as the print target selected by the apparatus selection unit, extracting the color difference perception messages that corresponds to the color difference average value and the color difference perception messages that corresponds to the color difference maximum value from the color difference table, and showing each extracted color difference perception message.

2. The image document creation apparatus according to claim 1, wherein the apparatus selection unit selects as the print target the image forming apparatus having the smallest color difference, based on the color difference average value obtained by the color difference calculation unit.

3. The image document creation apparatus according to claim 1, wherein the color gamut information acquisition unit confirms whether or not the image forming apparatus possesses a color conversion table, and when the image forming apparatus possesses a color conversion table, acquires that color conversion table as the color gamut information.

4. The image document creation apparatus according to claim 1, wherein when the image forming apparatus does not possess a color conversion table, the color gamut information acquisition unit acquires a color conversion table compatible with that image forming apparatus from outside via the network.

5. The image document creation apparatus according to claim 3, wherein the color difference calculation unit calculates a color difference by comparing the color conversion table to colors after color conversion according to the type of document data and/or image data to be printed has been performed.

6. The image document creation apparatus according to claim 1, wherein when the color difference average value obtained with the color difference calculation unit is within an allowable range that has been set in advance, the printing unit immediately starts printing of document data and/or image data, and when the calculated color difference is not within the allowable range, the printing unit temporarily stops printing of document data and/or image data.

7. The image document creation apparatus according to claim 1, further comprising an exclusion table in which information of an image forming apparatus excluded from selection targets has been registered in advance, wherein prior to selection of the color gamut information possessed by the image forming apparatuses on the network, the apparatus selection unit excludes from the selection targets a specific image forming apparatus that is registered in the exclusion table.

8. The image document creation apparatus according to claim 1, further comprising a trouble information acquisition unit that acquires trouble information of the image forming apparatuses from the image forming apparatuses, wherein prior to selection of the color gamut information possessed by the image forming apparatuses on the network, the apparatus selection unit excludes from the selection targets an image forming apparatus that is having trouble, based on the information acquired by the trouble information acquisition unit.

9. The image document creation apparatus according to claim 1, wherein when there are two or more image forming apparatuses for which the color difference average value obtained with the color difference calculation unit is within an allowable range that has been set in advance, the apparatus selection unit selects one image forming apparatus from among the plurality of image forming apparatuses according to a priority order that has been set in advance.

10. The image document creation apparatus according to claim 1, further comprising a usage history information acquisition unit that acquires usage history information of the image forming apparatuses from the image forming apparatuses, wherein when there are two or more image forming apparatuses for which the color difference average value obtained with the color difference calculation unit is within an allowable range that has been set in advance, the apparatus selection unit selects the image forming apparatus with the lowest frequency of use, based on the past usage history of each image forming apparatus acquired with the usage history information acquisition unit.

11. The image document creation apparatus according to claim 1, further comprising a usage history information acquisition unit that acquires usage history information of the image forming apparatuses from the image forming apparatuses, wherein when there are two or more image forming apparatuses for which the color difference average value obtained with the color difference calculation unit is within an allowable range that has been set in advance, the apparatus selection unit selects the image forming apparatus with the highest frequency of use, based on the past usage history of each image forming apparatus acquired with the usage history information acquisition unit.

12. The image document creation apparatus according to claim 1, wherein when there are two or more image forming apparatuses for which the color difference average value obtained with the color difference calculation unit is within an allowable range that has been set in advance, the apparatus selection unit selects the image forming apparatus that performed printing most recently.

13. The image document creation apparatus according to claim 1, wherein when there are two or more image forming apparatuses for which the color difference average value obtained with the color difference calculation unit is within an allowable range that has been set in advance, the apparatus selection unit selects the image forming apparatus with the lowest frequency of use.

14. The image document creation apparatus according to claim 1, wherein the color difference calculation unit calculates color difference with a color difference formula employing a color system, based on the input colors identified by the identification unit and the color gamut information acquired by the color gamut information acquisition unit.

15. A method for printing an image document in an image document creation apparatus provided so as to be connectable to a plurality of image forming apparatuses that have been arranged on a network, the image document creation apparatus having a color difference table in which color difference perception messages corresponding to a plurality of color differences have been registered in advance, the method comprising the steps of:
   acquiring color gamut information possessed by the image forming apparatuses via the network;
   identifying input colors included in document data and/or image data saved in the image document creation apparatus;
   performing, for each of the image forming apparatuses, processing to obtain a color difference sum and a color difference maximum value by calculating a color difference between the identified input colors and the acquired color gamut information and processing to obtain a color difference average value based on the obtained color difference sum and the number of input colors;
   selecting an image forming apparatus with the smallest color difference average value as a print target based on the obtained color difference average value;
   instructing the selected image forming apparatus to print the document data and/or the image data; and
   comparing, respectively to the color difference table, the color difference average value and the color difference maximum value obtained with the color difference calculation unit relative to the selected image forming apparatus, extracting the color difference perception message that corresponds to the color difference average value and the color difference perception message that corresponds to the color difference maximum value from the color difference table, and showing to a user each extracted color difference perception message.

16. A non-transitory computer-readable recording medium having instructions stored thereon, said instructions are read and executed by a processor for causing the processor to perform the method for printing an image document according to claim 15.

17. The image document creation apparatus according to claim 7, wherein, as the information of the image forming apparatus excluded from the selection targets, information of an image forming apparatus having a shorter operation time in a fixed period than the other image forming apparatuses has been registered in advance in the exclusion table.

18. The image document creation apparatus according to claim 7, wherein, as the information of the image forming apparatus excluded from the selection targets, information of an image forming apparatus installed in a location farther from an installation location of the image document creation apparatus than the other image forming apparatuses has been registered in advance in the exclusion table.

19. The method for printing an image document in the image document creation apparatus according to claim 15, the image document creation apparatus further having an exclusion table in which information of an image forming apparatus having a shorter operation time in a fixed period than the other image forming apparatuses has been registered in advance, the method further comprising the steps of:
   excluding, from selection targets being selected as the print target, the specific image forming apparatus that is registered in the exclusion table; and
   selecting, as the print target, an image forming apparatus having the smallest color difference average value among the selection target image forming apparatuses.

20. The method for printing an image document in the image document creation apparatus according to claim 15, the image document creation apparatus further having an exclusion table in which information of an image forming apparatus installed in a farther location from an installation location of the image document creation apparatus than the other image forming apparatuses has been registered in advance, the method further comprising the steps of:
   excluding, from selection targets being selected as the print target, the specific image forming apparatus that is registered in the exclusion table; and
   selecting, as the print target, an image forming apparatus having the smallest color difference average value among the selection target image forming apparatuses.

* * * * *